US011657658B2

(12) United States Patent
Maruno

(10) Patent No.: US 11,657,658 B2
(45) Date of Patent: May 23, 2023

(54) INFORMATION PROVIDING SERVER, INFORMATION PROVIDING SYSTEM, AND RECORDING MEDIUM

(71) Applicant: HONDA MOTOR CO., LTD., Tokyo (JP)

(72) Inventor: Naoki Maruno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 214 days.

(21) Appl. No.: 17/113,167

(22) Filed: Dec. 7, 2020

(65) Prior Publication Data

US 2021/0192865 A1    Jun. 24, 2021

(30) Foreign Application Priority Data

Dec. 23, 2019    (JP) .............................. JP2019-231875

(51) Int. Cl.
| | |
|---|---|
| *G07C 5/00* | (2006.01) |
| *H04L 67/12* | (2022.01) |
| *G06F 16/2457* | (2019.01) |
| *G06F 21/31* | (2013.01) |

(52) U.S. Cl.
CPC ......... *G07C 5/008* (2013.01); *G06F 16/2457* (2019.01); *G06F 21/31* (2013.01); *H04L 67/12* (2013.01)

(58) Field of Classification Search
CPC ..... G07C 5/008; G06F 16/2457; G06F 21/31; H04L 67/12
See application file for complete search history.

(56) References Cited

U.S. PATENT DOCUMENTS

| 11,379,899 | B2* | 7/2022 | Toya .................. G01C 21/3679 |
| 2010/0094496 | A1* | 4/2010 | Hershkovitz ........... B60L 50/66 701/22 |
| 2012/0140752 | A1* | 6/2012 | Yun ......................... B60L 53/65 370/338 |

(Continued)

FOREIGN PATENT DOCUMENTS

| JP | 2006-164820 | 6/2006 |
| JP | 2013-243913 | 12/2013 |

(Continued)

OTHER PUBLICATIONS

Japanese Office Action for Japanese Patent Application No. 2019-231875 dated Aug. 3, 2021.

*Primary Examiner* — Chris Parry
*Assistant Examiner* — Hassan A Khan
(74) *Attorney, Agent, or Firm* — Amin, Turocy & Watson, LLP

(57) ABSTRACT

An information providing server includes: a communication part configured to communicate with a terminal device; and a provision part configured to read information according to a request level from a battery database including a plurality of elements regarding a secondary battery in response to a request received by the communication part from the terminal device, the request including the request level representing a degree of information disclosure, and the request further including code information assigned to the secondary battery for a vehicle read by the terminal device, and provide the read information to the terminal device using the communication part.

7 Claims, 9 Drawing Sheets

| REQUEST LEVEL | BATTERY PROVISION INFORMATION | | | | | | | PROVISION TARGET PERIOD |
|---|---|---|---|---|---|---|---|---|
| | NORMAL TEMPERATURE CAPACITY | LOW TEMPERATURE CAPACITY | NORMAL TEMPERATURE OUTPUT | LOW TEMPERATURE OUTPUT | EFFICIENCY | SELF-DISCHARGING PERFORMANCE | USAGE HISTORY | |
| LEVEL 1 | ○ | ○ | × | × | × | × | × | ONE YEAR |
| LEVEL 2 | ○ | ○ | ○ | ○ | × | × | × | ONE YEAR |
| LEVEL 3 | ○ | ○ | ○ | ○ | × | × | ○ | ONE YEAR |
| LEVEL 4 | ○ | ○ | ○ | ○ | ○ | ○ | ○ | ONE YEAR |
| LEVEL 5 | ○ | ○ | ○ | ○ | ○ | ○ | ○ | WHOLE PERIOD |

(56) References Cited

U.S. PATENT DOCUMENTS

| | | | | |
|---|---|---|---|---|
| 2012/0330475 A1* | 12/2012 | Chen | | G06F 1/3212 |
| | | | | 700/292 |
| 2013/0085696 A1* | 4/2013 | Xu | | G06F 17/40 |
| | | | | 702/63 |
| 2013/0132268 A1* | 5/2013 | Cooper | | G06Q 40/03 |
| | | | | 705/38 |
| 2015/0149015 A1* | 5/2015 | Nakano | | B60L 53/80 |
| | | | | 701/22 |
| 2017/0176539 A1* | 6/2017 | Younger | | H04Q 9/00 |
| 2018/0009330 A1* | 1/2018 | Ricci | | G06V 40/1365 |
| 2018/0095140 A1* | 4/2018 | Park | | G01R 31/367 |
| 2018/0314988 A1* | 11/2018 | Harada | | G06Q 50/30 |
| 2018/0351401 A1* | 12/2018 | Binder | | G06F 3/14 |
| 2019/0039467 A1* | 2/2019 | Hortop | | H02J 7/0071 |
| 2019/0152327 A1* | 5/2019 | Choi | | B60L 53/64 |
| 2019/0207267 A1* | 7/2019 | Vickery | | B60L 53/66 |
| 2019/0207397 A1* | 7/2019 | Lai | | B60L 53/68 |
| 2019/0207398 A1* | 7/2019 | Shih | | H02J 7/0071 |
| 2019/0241080 A1* | 8/2019 | Chandra | | B60L 58/13 |
| 2020/0011997 A1* | 1/2020 | Dempsey | | G01S 17/89 |
| 2020/0037129 A1* | 1/2020 | Mezaael | | H04W 4/029 |
| 2020/0294090 A1* | 9/2020 | Morita | | G01R 31/367 |
| 2020/0339003 A1* | 10/2020 | Arvidsson | | B60L 53/18 |
| 2020/0339005 A1* | 10/2020 | Liao | | H02J 7/0014 |
| 2020/0376972 A1* | 12/2020 | Martin | | B60L 53/305 |
| 2020/0376977 A1* | 12/2020 | Lee | | B60L 53/68 |
| 2021/0094433 A1* | 4/2021 | Badger, II | | B60L 53/64 |
| 2021/0316633 A1* | 10/2021 | Kalligeros | | B60L 53/665 |
| 2021/0367277 A1* | 11/2021 | Takechi | | H01M 10/482 |
| 2022/0020082 A1* | 1/2022 | Kataoka | | B60L 53/665 |
| 2022/0176841 A1* | 6/2022 | Moura | | B60L 53/665 |
| 2022/0188946 A1* | 6/2022 | Moura | | G06Q 30/0283 |
| 2022/0289068 A1* | 9/2022 | Unagami | | B60L 53/305 |

FOREIGN PATENT DOCUMENTS

| | | |
|---|---|---|
| JP | 2016-532853 | 10/2016 |
| JP | 2019-004690 | 1/2019 |
| KR | 10-1468309 | 12/2014 |

* cited by examiner

FIG. 3

BATTERY DATABASE 282

| ID | NORMAL TEMPERATURE CAPACITY | LOW TEMPERATURE CAPACITY | NORMAL TEMPERATURE OUTPUT | LOW TEMPERATURE OUTPUT | EFFICIENCY | SELF -DISCHARGING PERFORMANCE | USAGE HISTORY |
|---|---|---|---|---|---|---|---|
| 001 | A | B | B | C | B | S | B |
| 002 | B | S | S | B | E | B | D |
| 003 | E | E | F | A | B | A | B |
|  |  |  |  |  |  |  |  |

| REQUEST LEVEL | BATTERY PROVISION INFORMATION | | | | | | | |
|---|---|---|---|---|---|---|---|---|
|  | NORMAL TEMPERATURE CAPACITY | LOW TEMPERATURE CAPACITY | NORMAL TEMPERATURE OUTPUT | LOW TEMPERATURE OUTPUT | EFFICIENCY | SELF -DISCHARGING PERFORMANCE | USAGE HISTORY | PROVISION TARGET PERIOD |
| LEVEL 1 | ○ | ○ | × | × | × | × | × | ONE YEAR |
| LEVEL 2 | ○ | ○ | ○ | ○ | × | × | × | ONE YEAR |
| LEVEL 3 | ○ | ○ | ○ | ○ | × | × | ○ | ONE YEAR |
| LEVEL 4 | ○ | ○ | ○ | ○ | ○ | ○ | ○ | ONE YEAR |
| LEVEL 5 | ○ | ○ | ○ | ○ | ○ | ○ | ○ | WHOLE PERIOD |

INFORMATION PROVIDING SERVER, INFORMATION PROVIDING SYSTEM, AND RECORDING MEDIUM

CROSS-REFERENCE TO RELATED APPLICATION

Priority is claimed on Japanese Patent Application No. 2019-231875, filed on Dec. 23, 2019, the contents of which are incorporated herein by reference.

BACKGROUND

Field of the Invention

The present invention relates to an information providing server, an information providing system, and a recording medium.

Background

In recent years, secondary use of secondary batteries (batteries) mounted in electric vehicles has increased. Secondary use of secondary batteries includes reuse as an in-vehicle secondary battery to be mounted in another vehicle and use for other purposes, for example, use in a power storage system. Conventionally, technologies regarding a device and a method for providing energy management and maintenance of a secondary battery for secondary use via the use of a secondary service port have been disclosed (for example, see Japanese Unexamined Patent Application, First Publication No. 2013-243913).

SUMMARY

There are various purposes for secondary use and there is also a variety of information that users who perform secondary use want to ascertain. However, in the technology disclosed in Japanese Unexamined Patent Application, First Publication No. 2013-243913, information for providing a secondary battery for secondary use is fixed and it is difficult for a person who performs secondary use to ascertain desired information.

An object of an aspect of the present invention is to provide an information providing server, an information providing system, and a recording medium capable of allowing a status of a secondary battery to be ascertained according to the purpose of secondary use.

According to a first aspect of the present invention, an information providing server is provided including: a communication part configured to communicate with a terminal device; and a provision part configured to read information according to a request level from a battery database including a plurality of elements regarding a secondary battery in response to a request received by the communication part from the terminal device, the request including the request level representing a degree of information disclosure, and the request further including code information assigned to the secondary battery for a vehicle read by the terminal device, and provide the read information to the terminal device using the communication part.

A second aspect of the present invention is the information providing server according to the above-described first aspect, wherein the element may be at least one of an item and a quantity.

A third aspect of the present invention is the information providing server according to the above-described first or second aspect, wherein, as the request level increases, a number of elements included in the information according to the request level read from the battery database provided by the provision part may increase.

A fourth aspect of the present invention is the information providing server according to any of the above-described first to third aspects, wherein the communication part may communicate with the vehicle on which the secondary battery is mounted, and the information providing server may further include an acquisition part configured to acquire battery information about the secondary battery transmitted by the vehicle.

According to a fifth aspect of the present invention, an information providing system is provided including: the information providing server according to any of the above-described first to fourth aspects; and an application program configured to be executed in the terminal device, wherein the application program causes the terminal device to read the code information assigned to the secondary battery and transmit the read code information to the information providing server.

According to a sixth aspect of the present invention, a computer-readable non-transitory recording medium is provided storing a program for causing a computer of a terminal device to read code information assigned to a secondary battery and transmit the read code information to the information providing server according to any of the above-described first to fourth aspects.

According to a seventh aspect of the present invention, a computer-readable non-transitory recording medium is provided storing a program for causing a computer to: communicate with a terminal device; and read a status according to a request level from a battery database including a plurality of elements regarding a secondary battery in response to a request transmitted from the terminal device, the request including the request level representing a degree of information disclosure, and the request further including code information assigned to the secondary battery for a vehicle read by the terminal device, and provide information about the read status to the terminal device.

According to the above-described first to seventh aspects, the status of the secondary battery can be ascertained according to the purpose of secondary use.

According to the above-described second aspect, specific information can be provided according to the purpose of use by a user.

According to the above-described third aspect, information according to a quantity requested by the user can be provided.

According to the above-described fourth aspect, battery information can be acquired and updated at any time.

BRIEF DESCRIPTION OF THE DRAWINGS

FIG. 3 is a diagram showing an example of a battery database.

FIG. 4 is a diagram showing a relationship between a request level and battery provision information.

DESCRIPTION OF EMBODIMENTS

Hereinafter, embodiments of an information providing server, an information providing system, and a recording medium of the present invention will be described with reference to the drawings. In the following description, it is assumed that a vehicle 10 is an electric vehicle. It is only necessary for the vehicle 10 to be a vehicle that can be charged from outside and a vehicle equipped with a secondary battery that supplies electric power for traveling. The vehicle 10 may be a hybrid automobile or a fuel cell vehicle.

[Overall Structure]

Figure 1:
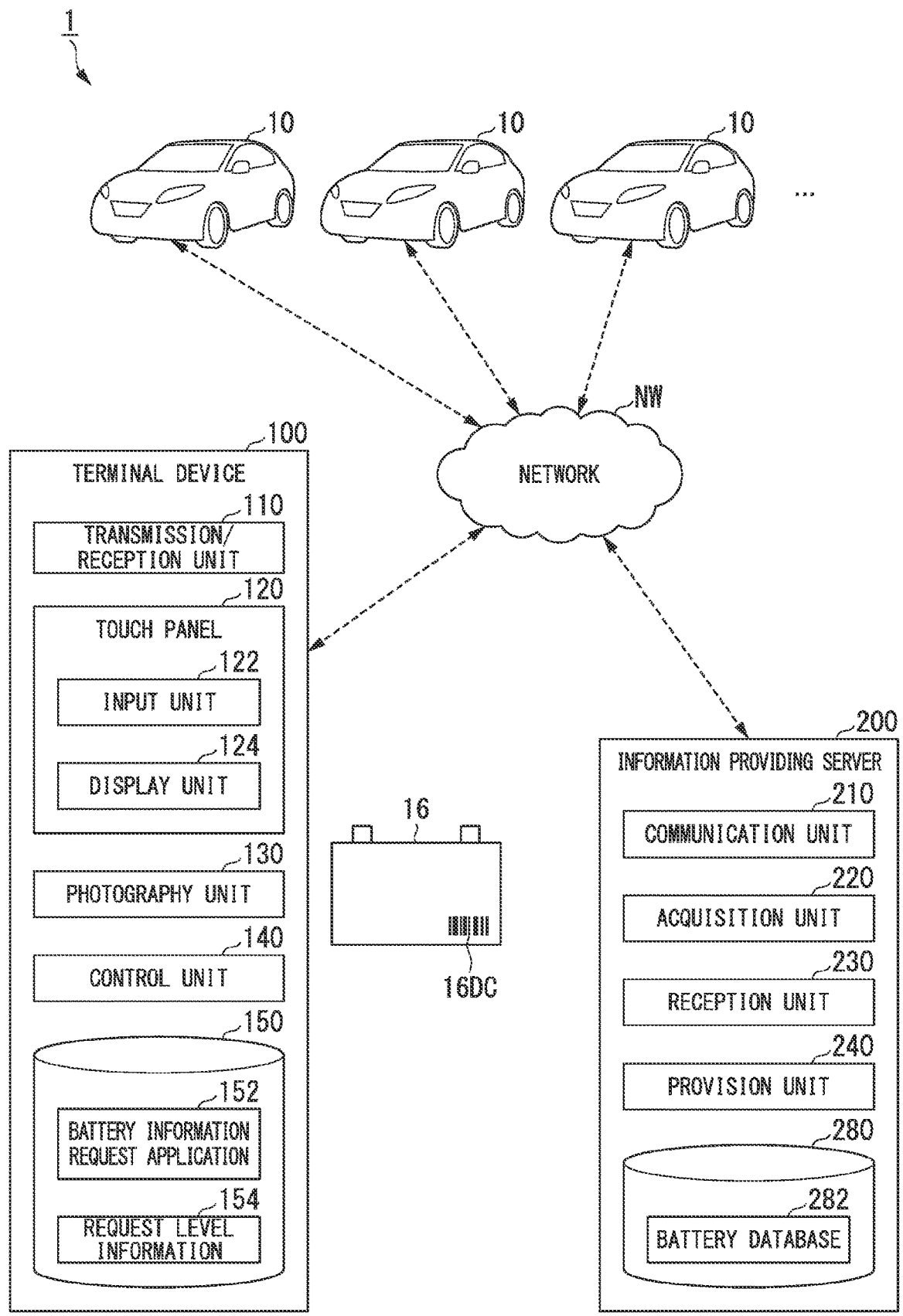
FIG. 1 is a diagram showing an example of an information providing system according to an embodiment.

FIG. 1 is a diagram showing an example of an information providing system 1 according to an embodiment. The information providing system 1 is a system that provides a terminal device 100 with battery information stored by an information providing server 200 in response to a request from the terminal device 100. For example, the terminal device 100 is used by a user who performs secondary use of a battery. For example, the information providing server 200 collects battery information of a vehicle battery mounted in the vehicle 10 and generates a battery database. The information providing server 200 is used by an information provider that reads battery provision information from the generated battery database and provides the user with the read battery provision information in response to a request from the user. For example, the information provider sells the authority to receive the battery provision information to the user. For example, the user receives the battery provision information provided by the information provider on the basis of the authority that has been purchased. The user receives the battery provision information and uses the received battery provision information as a material for evaluating the suitability of the battery for secondary use on the basis of the battery provision information.

As shown in FIG. 1, the information providing server 200 communicates with the vehicle 10 and the terminal device 100 via the network NW. For example, the network NW includes the Internet, a wide area network (WAN), a local area network (LAN), a provider device, a radio base station, and the like.

The information providing server 200 acquires and stores battery information transmitted by each of a plurality of vehicles 10. When an information provision request has been received from the terminal device 100, the information providing server 200 transmits battery information according to the request to the terminal device 100. The vehicle 10 transmits the battery information for the information providing server 200 to generate and update the battery database 282. Hereinafter, configurations of the vehicle 10, the terminal device 100, and the information providing server 200 will be described.

[Vehicle 10]

Figure 2:
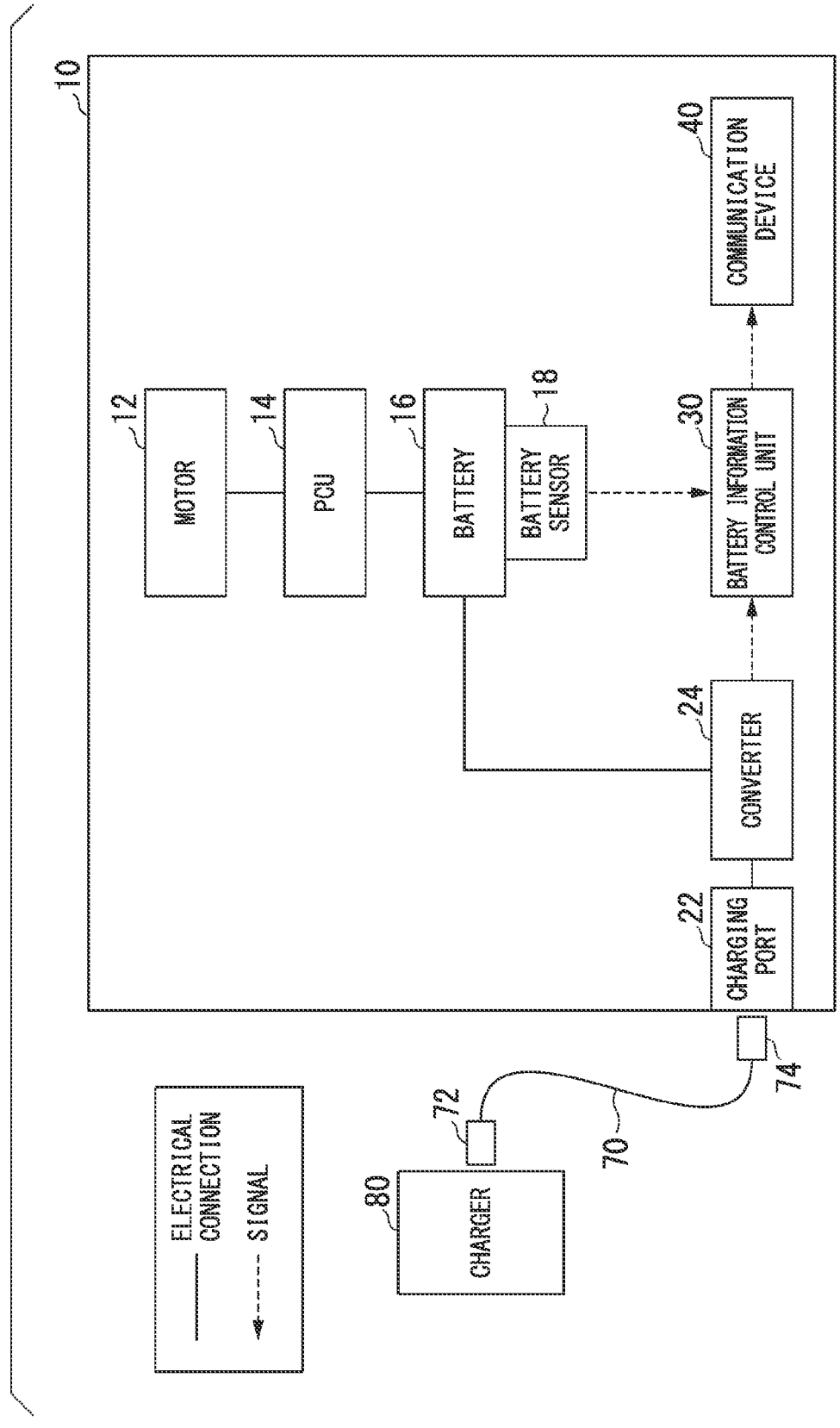
FIG. 2 is a diagram showing an example of a configuration of a vehicle.

FIG. 2 is a diagram showing an example of the configuration of the vehicle 10. As shown in FIG. 2, for example, the vehicle 10 includes a motor 12, a power control unit (PCU) 14, a battery 16, a battery sensor 18, a charging port 22, a converter 24, and a battery information control unit 30, and a communication device 40.

The motor 12 is, for example, a three-phase AC electric motor. A rotor of the motor 12 is connected to drive wheels. The motor 12 rotates the drive wheels with electric power that has been supplied. The motor 12 uses kinetic energy of the vehicle to generate electric power when the vehicle decelerates. The PCU 14 includes, for example, a control unit and a direct current (DC)-DC converter. For example, the control unit calculates the electric power to be supplied to the motor 12 on the basis of detection values of various types of sensors provided in the vehicle. For example, the DC-DC converter boosts electric power supplied from the battery 16 and supplies the electric power calculated by the control unit to the motor 12.

For example, the battery 16 is a secondary battery such as a lithium ion battery. The battery 16 stores electric power introduced from the charger 80 outside the vehicle 10 and is discharged for traveling of the vehicle 10. For example, the battery sensor 18 is a group of sensors including an electric current sensor, a voltage sensor, and a temperature sensor. For example, the battery sensor 18 outputs an electric current value, a voltage value, and a temperature of the battery 16 to the battery information control unit 30.

The charging port 22 is provided directed toward outside of a vehicle body of the vehicle 10. The charging port 22 is connected to the charger 80 via the charging cable 70. The charging cable 70 includes a first plug 72 and a second plug 74. The first plug 72 is connected to the charger 80. The second plug 74 is connected to the charging port 22. Electricity supplied from the charger 80 is supplied to the charging port 22 via the charging cable 70. The charger 80 may be connectable to the network NW. The charging cable 70 includes a signal cable attached to the power cable. The signal cable mediates communication between the vehicle 10 and the charger 80. Thus, a power connector and a signal connector are provided in the first plug 72 and the second plug 74.

The converter 24 is provided between the charging port 22 and the battery 16. The converter 24 converts an electric current introduced from the charger 80 via the charging port 22, for example, an alternating current (AC), into a DC. The converter 24 outputs the DC obtained through the conversion to the battery 16.

The battery information control unit 30 calculates a state of the battery 16 on the basis of the electric current value, the voltage value, and the temperature of the battery 16 output by the battery sensor 18. In the state of the battery 16, items such as a normal temperature capacity, a low temperature capacity, a normal temperature output, a low temperature output, efficiency, self-discharging performance, and a usage history are included. The battery information control unit 30 includes a battery ID in battery information about the calculated state of the battery 16 and outputs the battery information to the communication device 40.

The communication device 40 includes a radio module for connecting to a cellular network or a Wi-Fi network.

The communication device 40 transmits the battery information output by the battery information control unit 30 to the information providing server 200 via the network NW shown in FIG. 1.

[Terminal Device 100]

The terminal device 100 shown in FIG. 1 is, for example, a portable terminal device, a tablet, or the like which is used by a user. For example, the user may be assumed to be a vehicle repair shop, a battery reuse company, a battery performance researcher, or the like, who performs secondary use of the battery 16 after it is removed from the vehicle. The user may also be assumed to be an owner of a vehicle equipped with the battery 16.

For example, the terminal device 100 includes a transmission/reception unit 110, a touch panel 120, a photography unit 130, a control unit 140, and a terminal storage unit 150. A battery information request application 152 is installed in the terminal device 100. The battery information request application 152 is an application program that supports services including the provision of information of the battery 16. When the battery information request application 152 is activated, the terminal device 100 can be used as a device that requests the information providing server 200 to provide battery information. For example, the terminal storage unit 150 stores request level information 154 according to the authority purchased by the user from the information provider. The request level information 154 is information representing a degree of information disclosure.

The transmission/reception unit 110 is, for example, a wireless communication device that can access the network NW using a cellular network or a Wi-Fi network. The transmission/reception unit 110 transmits request information including a request output by the control unit 140 to the information providing server 200. The request information is information for requesting battery provision information. The transmission/reception unit 110 receives various types of information transmitted by the information providing server 200.

For example, the touch panel 120 includes an input unit 122 and a display unit 124. For example, the input unit 122 receives an input operation based on a manual operation of the user. The input unit 122 receives the input operation of the user through a graphical user interface (GUI) switch set in the display unit 124. For example, the GUI switch is displayed in the form of a selectable button. For example, the input operation of the user is an operation in which the user touches (presses) the GUI switch on the touch panel. The input unit 122 outputs the input information to the control unit 140 when there is an input operation by the user. The display unit 124 displays an image based on the control of the control unit 140.

The photography unit 130 is, for example, a camera provided to face outside of a housing of the terminal device 100. For example, the photography unit 130 photographs a two-dimensional code 16DC assigned to the battery 16 removed from the vehicle 10 under the control of the control unit 140. The photography unit 130 outputs image information of a captured image to the control unit 140.

The two-dimensional code 16DC includes code information assigned to the battery 16. The two-dimensional code 16DC may be any code, for example, a barcode or a QR code (registered trademark). For example, the code information includes information about the battery ID assigned to the battery 16 and a date of manufacturing of the battery 16 and the like.

Here, the battery 16 is, for example, a battery before secondary use after the battery 16 is removed from the vehicle 10. For example, the two-dimensional code 16DC is displayed on the battery 16 before the start of a transaction for secondary use after the battery 16 is removed from the vehicle 10. The two-dimensional code 16DC may be displayed directly on the battery 16, may be displayed on a packing material for packing the battery 16, or may be displayed in a document or advertisement when a transaction for secondary use is performed in a place different from the battery 16. The two-dimensional code 16DC may be displayed through printing or the like or may be displayed in an image or the like using a display device or the like.

The control unit 140 receives input information and the like output by the touch panel 120. When the input information has been output by the touch panel 120, the control unit 140 generates request information for requesting battery provision information on the basis of code information and request level information. The control unit 140 transmits the generated request information to the information providing server 200 using the transmission/reception unit 110. The control unit 140 causes the photography unit 130 to photograph the two-dimensional code 16DC attached to the battery 16. The control unit 140 reads the code information from an image of the two-dimensional code 16DC included in the image information output by the photography unit 130.

The control unit 140 generates request information on the basis of the code information read from the image of the two-dimensional code 16DC and the request level information 154 read from the terminal storage unit 150. The request information includes the code information read from the two-dimensional code 16DC and the read request level information 154.

For the request level included in the request level information 154, for example, one of five levels from level 1 to level 5 in ascending order is set. For example, the authority to have request level information of a high request level is more expensive than the authority to have request level information of a low request level and is sold by the information provider.

The user purchases the authority to have a required request level from the information provider according to the purpose of secondary use of the battery 16. For example, when the owner of the vehicle 10 is the user, it is only necessary for the battery provision information to be information for determining suitability for traveling of the vehicle 10 and the request level does not have to be high. Thus, for example, the request level information whose request level is level 1 is a request level set by the user who is the owner of the vehicle 10. For example, in the case of a researcher who studies battery deterioration, for example, it is desirable that various types of information be included as battery provision information and the authority to have a high request level is desired even if the price is high.

Thus, for example, the request level information whose request level is level 5 is a request level set for a researcher who studies battery deterioration.

The control unit 140 receives the battery provision information transmitted by the information providing server 200 using the transmission/reception unit 110. The control unit 140 generates an image according to the received battery provision information. The control unit 140 causes the display unit 124 of the touch panel 120 to display the generated image.

[Information Providing Server 200]

For example, the information providing server 200 shown in FIG. 1 includes a communication unit 210, an acquisition unit 220, a reception unit 230, a provision unit 240, and a storage unit 280. The acquisition unit 220, the reception unit 230, and the provision unit 240 are implemented by, for example, a hardware processor such as a central processing unit (CPU) executing a program (software). Some or all of these components may be implemented by hardware (a circuit unit including circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device (a non-transitory storage medium) such as a hard disk drive (HDD) or a flash memory or may be stored in a removable storage medium (a non-transitory storage medium) such as a DVD or a CD-ROM and installed when the storage medium is mounted in a drive device. The storage unit 280 is implemented by the above-described storage device.

The communication unit 210 includes a communication interface such as a network interface card (NIC). The communication unit 210 performs communication between the communication device 40 mounted in each of the plurality of vehicles 10 and the transmission/reception unit 110 mounted in the terminal device 100 via the network NW.

The communication unit 210 receives the battery information transmitted by each of the plurality of vehicles 10 and the request information transmitted by the terminal device 100. The communication unit 210 outputs the received battery information to the acquisition unit 220. The communication unit 210 outputs the request information to the reception unit 230.

The acquisition unit 220 acquires the battery information output by the communication unit 210. The acquisition unit 220 updates or generates the battery database 282 stored in the storage unit 280 on the basis of the acquired battery information. The acquisition unit 220 confirms whether or not the battery database 282 includes data of a battery ID which is the same as the battery ID included in the acquired battery information. The acquisition unit 220 updates the battery database 282 when the battery database 282 includes data of a battery ID which is the same as the battery ID included in the acquired battery information. The acquisition unit 220 newly generates the battery database 282 when the battery database 282 does not include data of a battery ID which is the same as the battery ID included in the acquired battery information.

Here, the battery database 282 will be described. FIG. 3 is a diagram showing an example of the battery database 282. As shown in FIG. 3, the battery database 282 includes battery IDs assigned to the plurality of batteries 16. The battery database 282 includes items of a "normal temperature capacity," a "low temperature capacity," a "normal temperature output," a "low temperature output," "efficiency," "self-discharging performance," and a "usage history" as elements in each of the plurality of batteries 16. In the battery database 282, evaluations of the items of the "normal temperature capacity," the "low temperature capacity," the "normal temperature output," the "low temperature output," the "efficiency," the "self-discharging performance," and the "usage history" with respect to the plurality of batteries 16 are stored. The evaluations are "S," "A," "B," "C," "D," and "E" in descending order. For example, in a battery with a battery ID of "001," the "normal temperature capacity" is "A," the "low temperature capacity" is "B," the "normal temperature output" is "B," the "low temperature output" is "C," the "efficiency" is "B," the "self-discharging performance" is "S," and the "usage history" is "B."

For example, the acquisition unit 220 additionally updates the battery database 282 output by the communication unit 210 daily. The battery database 282 including the evaluation of each item on a daily basis is stored in the storage unit 280. The battery database 282 may be additionally updated daily or may be additionally updated at other times, for example, every two days, weekly, or monthly. In this case, the acquisition unit 220 may delete old data from the battery database 282. Also, the additional update of the battery database 282 may be performed at different time intervals for each data item or may be performed every time data is acquired.

The acquisition unit 220 may update the battery database 282 by the evaluation of each item being calculated from the acquired battery information instead of updating the battery database 282 to content of each item included in the battery information. Alternatively, the acquisition unit 220 may calculate the evaluation of each item on the basis of the acquired battery information and the battery database 282 stored in the storage unit 280 and update the battery database 282.

The reception unit 230 receives the request information output by the communication unit 210. When the request information has been received, the reception unit 230 authenticates a user who has transmitted the request information on the basis of user ID information included in the request information. Also, the request information includes only the user ID information and the storage unit 280 may store request level information according to a request level corresponding to the user ID information.

When the reception unit 230 has received the request information, the provision unit 240 reads information according to the request level from the battery database 282 in response to the request information. The provision unit 240 generates the battery provision information to be transmitted to the terminal device 100 and provided to the user on the basis of the information read from the battery database 282.

The provision unit 240 determines content of the battery provision information to be generated in accordance with the request level included in the request information. The provision unit 240 generates battery provision information including more elements as the request level based on the request information becomes higher. The elements included in the battery provision information generated by the provision unit 240 are items such as a "normal temperature capacity" and a "low temperature capacity" in the battery database 282 and quantities such as acquisition periods of these items.

Here, a relationship between the request level and the battery provision information will be described. FIG. 4 is a diagram showing a relationship between the request level and the battery provision information. As shown in FIG. 4, when the request level included in the request information is level 1, a "normal temperature capacity" and a "low temperature capacity" for one year are included in the battery provision information. When the request level included in the request information is level 2, a "normal temperature capacity," a "low temperature capacity," a "normal temperature output," and a "low temperature output" for one year are included in the battery provision information. When the request level included in the request information is level 3, a "normal temperature capacity," a "low temperature capacity," a "normal temperature output," a "low temperature output," and a "usage history" for one year are included in the battery provision information. When the request level included in the request information is level 4, all items for one year are included in the battery provision information. If the request level included in the request information is level 5, all items for the entire period are included in the battery provision information.

The provision unit 240 provides the generated battery provision information to the user. The provision unit 240 uses the communication unit 210 to transmit the battery provision information to the terminal device 100 of the user so that the battery provision information is provided to the user. The terminal device 100 receives the battery provision information transmitted by the provision unit 240 in the transmission/reception unit 110 and the transmission/reception unit 110 outputs the received battery provision information to the control unit 140. The control unit 140 causes the display unit 124 of the touch panel 120 to display an image based on the battery provision information output by the transmission/reception unit 110 and provides the user with the image.

Next, processes of the vehicle 10, the terminal device 100, and the information providing server 200 will be individually described with respect to a process executed in the information providing system 1.

[Process of Vehicle 10]

The vehicle 10 calculates the state of the battery 16 mounted in the vehicle at an appropriate timing in the battery information control unit 30. The appropriate timing may be specified in any manner and may be, for example, a timing with a regular time interval or a predetermined time. Also, the timing may be specified by a manager of the information providing server 200 or may be a timing specified by the owner of the vehicle 10.

The vehicle 10 transmits the battery information calculated in the battery information control unit 30 to the information providing server 200 through the communication device 40. The timing at which the vehicle 10 transmits the battery information to the information providing server 200 may be specified in any manner. For example, the timing may be specified every time the battery information is calculated or may be a timing with a regular time interval. Also, the timing may be specified by the manager of the information providing server 200 or the owner of the vehicle 10. When the battery information transmitted by the vehicle 10 is transmitted every time the battery information is calculated, the battery information may be only calculated battery information or the battery information including the calculated battery information and previously calculated battery information may be transmitted. When the battery information is transmitted at other timings, a plurality of pieces of battery information may be collectively transmitted for the battery information.

[Process of Terminal Device 100]

The terminal device 100 transmits request information to the information providing server 200 and receives the battery provision information provided by the information providing server 200 to display the battery provision information on the display unit 124 of the touch panel 120 in accordance with an operation of the user of the terminal device 100. Hereinafter, for example, a procedure until a user who has a battery whose battery provision information is desired to be received transmits the request information will be described.

Figure 5:
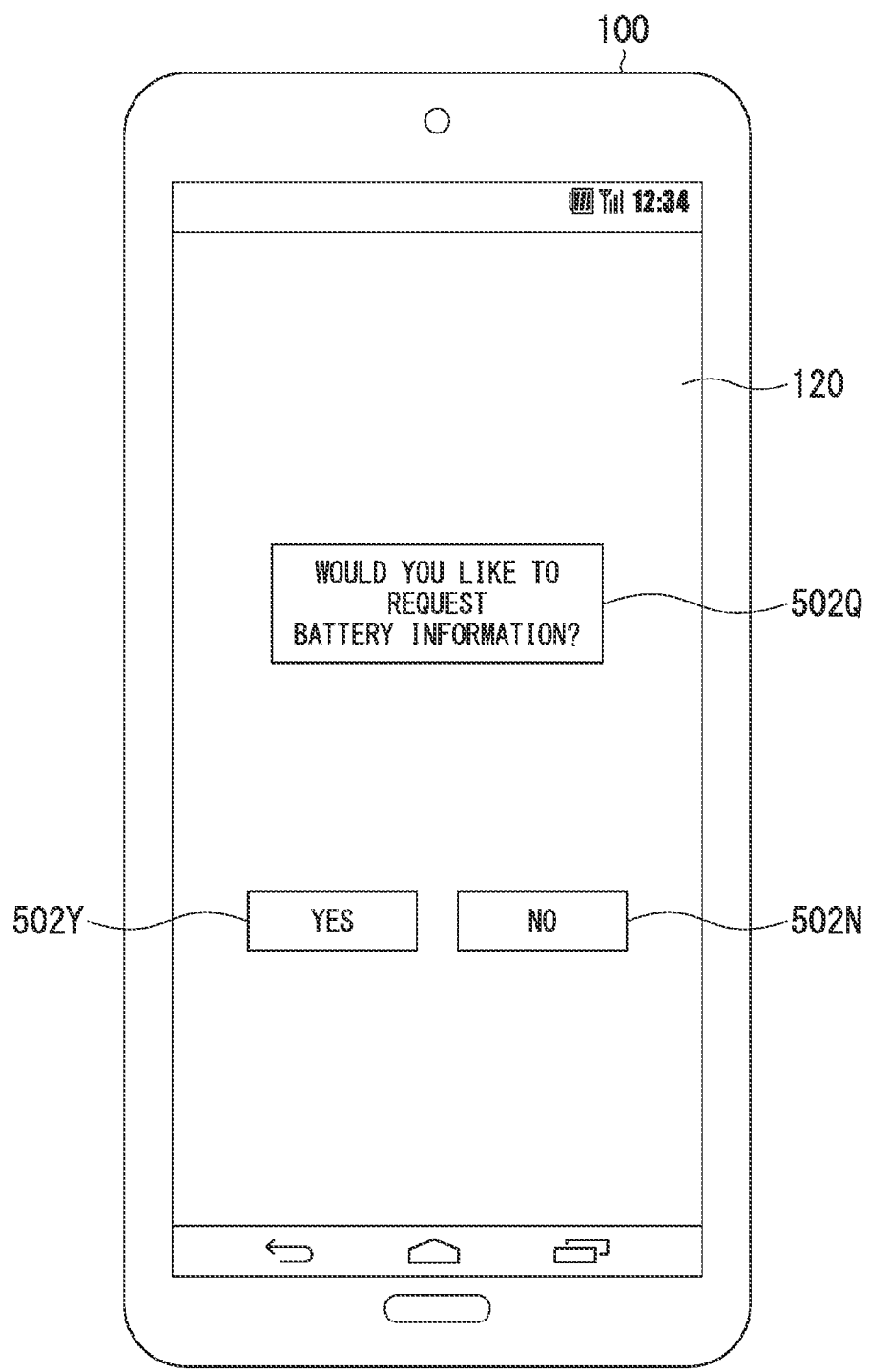
FIG. 5 is a diagram showing an example of an image displayed on a terminal device in which a battery information request application has been activated.

The user who wants to receive the battery information that has been provided operates the terminal device 100 to start up the battery information request application 152. The terminal device 100 that has received the operation activates the battery information request application 152 through the control unit 140. FIG. 5 is a diagram showing an example of an image displayed on the terminal device 100 in which the battery information request application 152 is activated.

As shown in FIG. 5, the control unit 140 causes the touch panel 120 to display a request image 502Q, an accept button 502Y, and a reject button 502N. The request image 502Q is an image for displaying text information of "Would you like to request battery information?" and is an image for notifying the user that the battery provision information can be requested. The control unit 140 notifies the user that the battery provision information can be requested by displaying the request image 502Q.

The accept button 502Y is a GUI switch on which text information of "OK" is displayed. When the user wants to request the battery provision information, the user operates the accept button 502Y. The reject button 502N is a GUI switch on which text of "Cancel" is displayed. A user who does not intend to request battery information and wants to end the battery information request application 152 operates the reject button 502N.

When the user operates the accept button 502Y as an input operation, the touch panel 120 outputs input information to the control unit 140 and the control unit 140 controls the terminal device 100 such that it is brought into a state in which the photography unit 130 can perform photography. When the user operates the reject button 502N, the control unit 140 ends the battery information request application 152.

Figure 6:
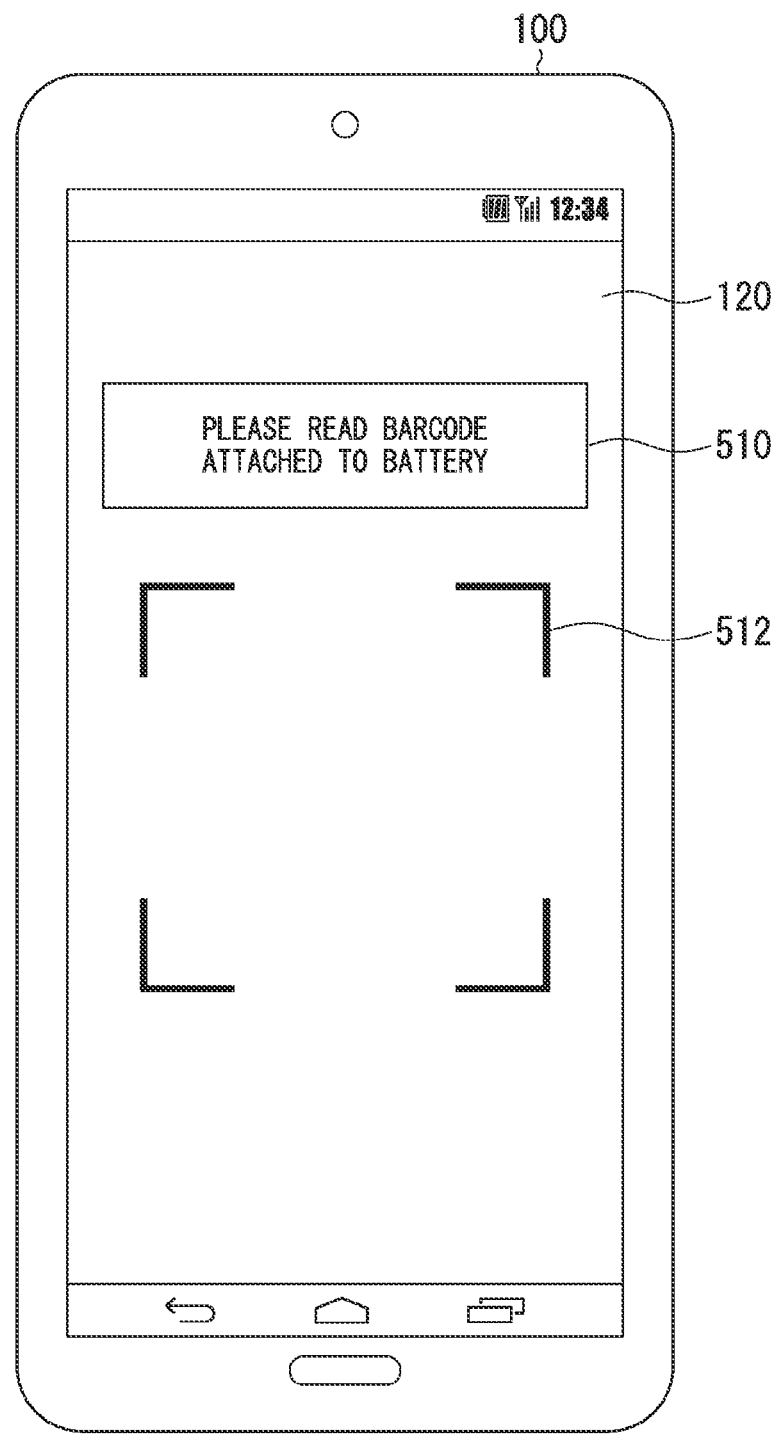
FIG. 6 is a diagram showing another example of an image displayed on the terminal device on which an accept button has been operated.

FIG. 6 is a diagram showing an example of an image displayed on the terminal device 100 in which the accept button 502Y has been operated. When the user performs an input operation, the control unit 140 causes the touch panel 120 to display a photography instruction image 510 and a frame image 512 as shown in FIG. 6. For example, the control unit 140 causes a text image of "Please read the barcode attached to the battery" to be displayed as the photography instruction image 510. The control unit 140 causes the frame image 512 to be displayed below the photography instruction image 510.

For example, when the user performs an operation on the photography unit 130 to read the two-dimensional code 16DC included in the frame image 512 in accordance with the instruction based on the photography instruction image 510, the control unit 140 causes the photography unit 130 to photograph the two-dimensional code 16DC. The photography unit 130 outputs image information including the two-dimensional code 16DC to the control unit 140.

The control unit 140 reads code information from the image of the two-dimensional code 16DC included in the image information output by the photography unit 130 and acquires a battery ID and manufacturing date information of the battery 16 included in the code information. Subsequently, the control unit 140 reads a user ID and request level information stored in the terminal storage unit 150 and generates request information. Subsequently, the control unit 140 transmits the generated request information to the information providing server 200 using the transmission/reception unit 110.

Also, if the battery provision information has been transmitted by the information providing server 200 when the battery information request application 152 has been activated, the terminal device 100 receives the transmitted battery provision information through the transmission/reception unit 110. If the terminal device 100 has received the battery provision information when the battery information request application 152 has not been activated, the battery information request application 152 may be configured to be activated.

Figure 7:
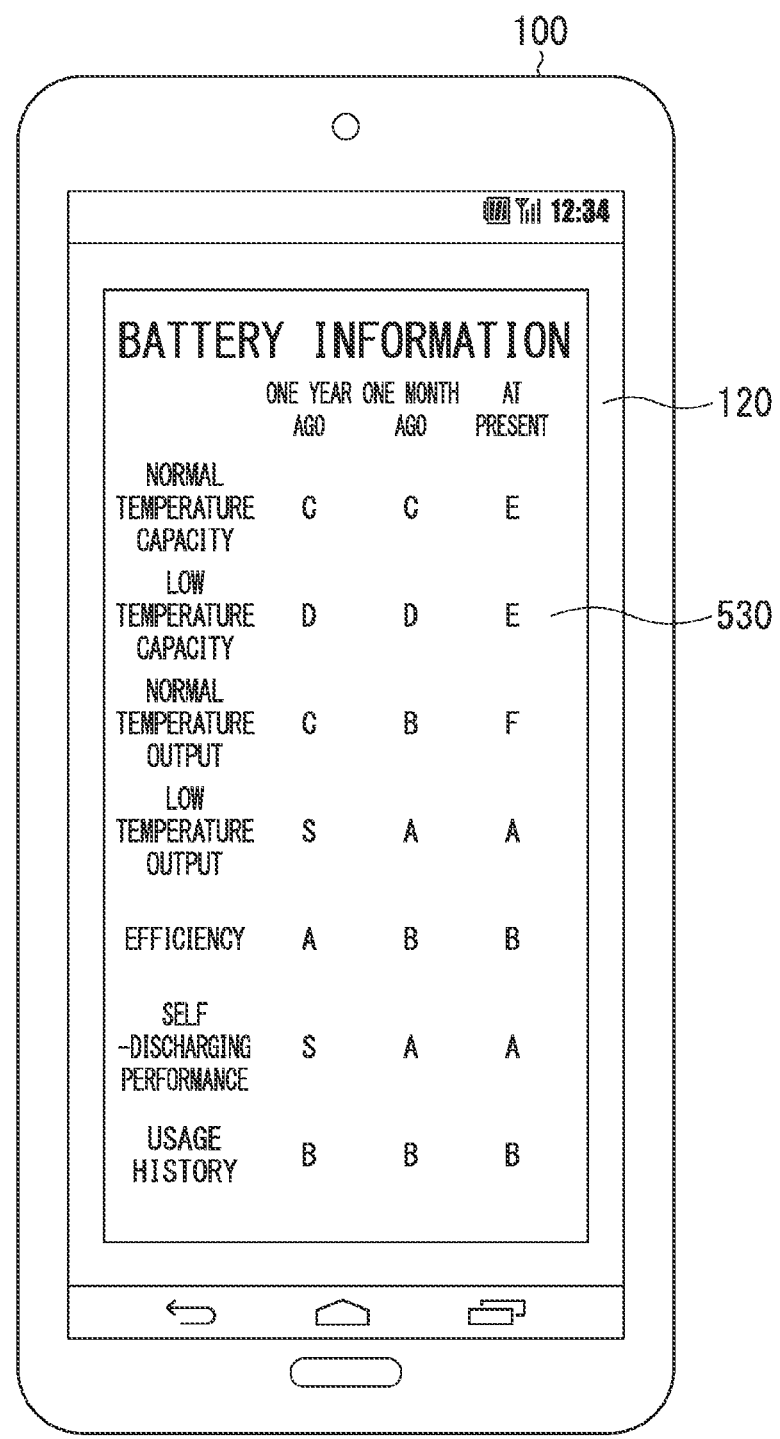
FIG. 7 is a diagram showing an example of an image displayed on the terminal device that has received battery information.

The transmission/reception unit 110 outputs the received battery provision information to the control unit 140. When the battery provision information output by the transmission/reception unit 110 has been acquired, the control unit 140 causes the display unit 124 to display each element included in the battery provision information. FIG. 7 is a diagram showing an example of an image displayed on the terminal device 100 that has received the battery provision information.

As shown in FIG. 7, the touch panel 120 of the terminal device 100 that has received the battery provision information displays the battery manufacturing date and each element of the battery provision information 530. Each element of the battery provision information 530 displayed on the touch panel 120 differs according to a request level stored in the terminal device 100. In other words, each element of the battery provision information 530 provided by the information providing server 200 for the terminal device 100 differs according to the request level stored in the terminal device 100. In the example shown in FIG. 7, the battery provision information 530 according to the request level which is level 4 is displayed.

[Process of Information Providing Server 200]

Next, the process of the information providing server 200 will be described. The information providing server 200 mainly performs a process of updating the battery database 282 and a process of providing battery provision information. These processes may be performed in a series of processes or may be performed in different processes. In the embodiment, the process of updating the battery database 282 and the process of providing the battery provision information will be described as different processes.

Figure 8:
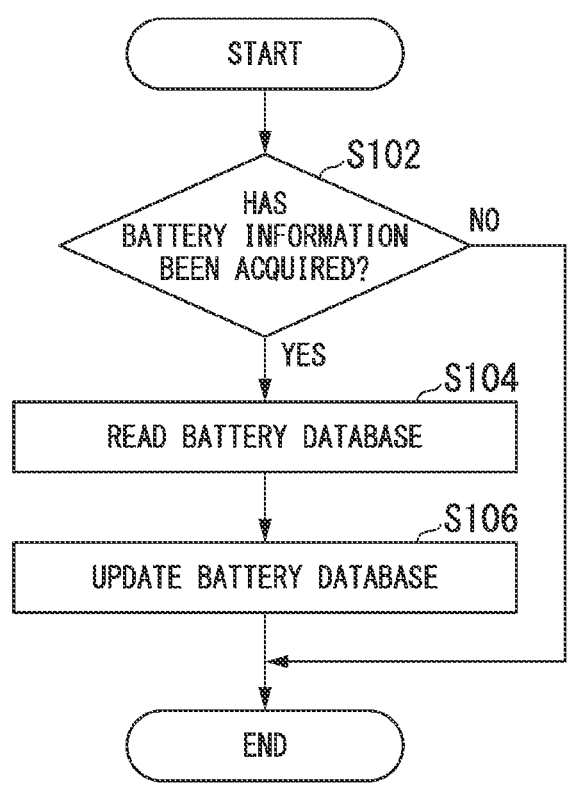
FIG. 8 is a flowchart showing an example of a process in an information providing server.

First, the process of updating the battery database 282 will be described. FIG. 8 is a flowchart showing an example of the process of the information providing server 200. As shown in FIG. 8, the information providing server 200 determines whether or not the acquisition unit 220 has acquired the battery information transmitted by the vehicle 10 (step S102). When it is determined that the acquisition unit 220 has not acquired the battery information, the information providing server 200 ends the process shown in FIG. 8. When it is determined that the acquisition unit 220 has acquired the battery information, the acquisition unit 220 reads the battery database 282 stored in the storage unit 280 (step S104).

Subsequently, the acquisition unit 220 adds the acquired battery information to the battery database 282 and updates the battery database 282 (step S106). The acquisition unit 220 acquires a battery ID included in the battery information transmitted by the vehicle 10 so that the battery database is updated. The acquisition unit 220 refers to the battery ID, reads the battery database 282 having a battery ID that is the same as the acquired battery ID from the battery information included in the battery database 282 stored in the storage unit 280, and adds the acquired information to the battery database 282. Thus, the information providing server 200 updates the battery database 282 and completes the process shown in FIG. 8.

Figure 9:
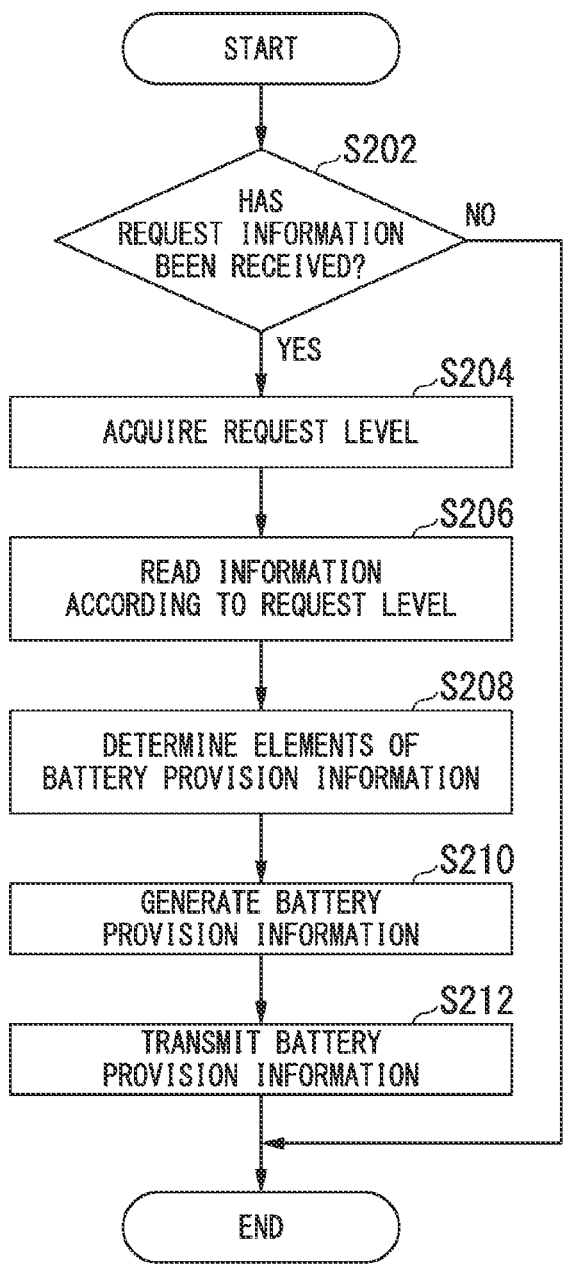
FIG. 9 is a flowchart showing another example of a process in the information providing server.

Next, the process of providing the battery provision information will be described. FIG. 9 is a flowchart showing another example of the process of the information providing server 200. As shown in FIG. 9, the information providing server 200 determines whether or not the reception unit 230 has received request information transmitted by the terminal device 100 (step S202). When it is determined that the request information transmitted by the terminal device 100 has not been received, the information providing server 200 ends the process of the flowchart shown in FIG. 9 as it is.

When it is determined that the request information transmitted by the terminal device 100 has been received, the provision unit 240 acquires a request level included in the request information (step S204). Subsequently, the provision unit 240 reads information according to the acquired request level from the battery database 282 stored in the storage unit 280 (step S206). Subsequently, the provision unit 240 determines an element of battery provision information to be provided to the user on the basis of the read battery database 282 (step S208).

For example, when the request level included in the request information is level 1, information of a "normal temperature capacity" and a "low temperature capacity" for one year is read from the battery database 282 and is determined as elements of the battery provision information (step S208). Alternatively, when the request level included in the request information is level 5, information for the entire period of all items is read from the battery database 282 and is determined as elements of the battery provision information. The provision unit 240 generates battery provision information including the determined elements (step S210).

Subsequently, the provision unit 240 transmits the generated battery provision information to the terminal device 100 that has transmitted the request information via the communication unit 210 (step S212). The provision unit 240 transmits the battery provision information to the terminal device 100, so that the information providing server 200 provides the battery provision information to the user. Thus, the information providing server 200 completes the process shown in FIG. 9.

[Flow of Process of Entire Information Providing System 1]

Figure 10:
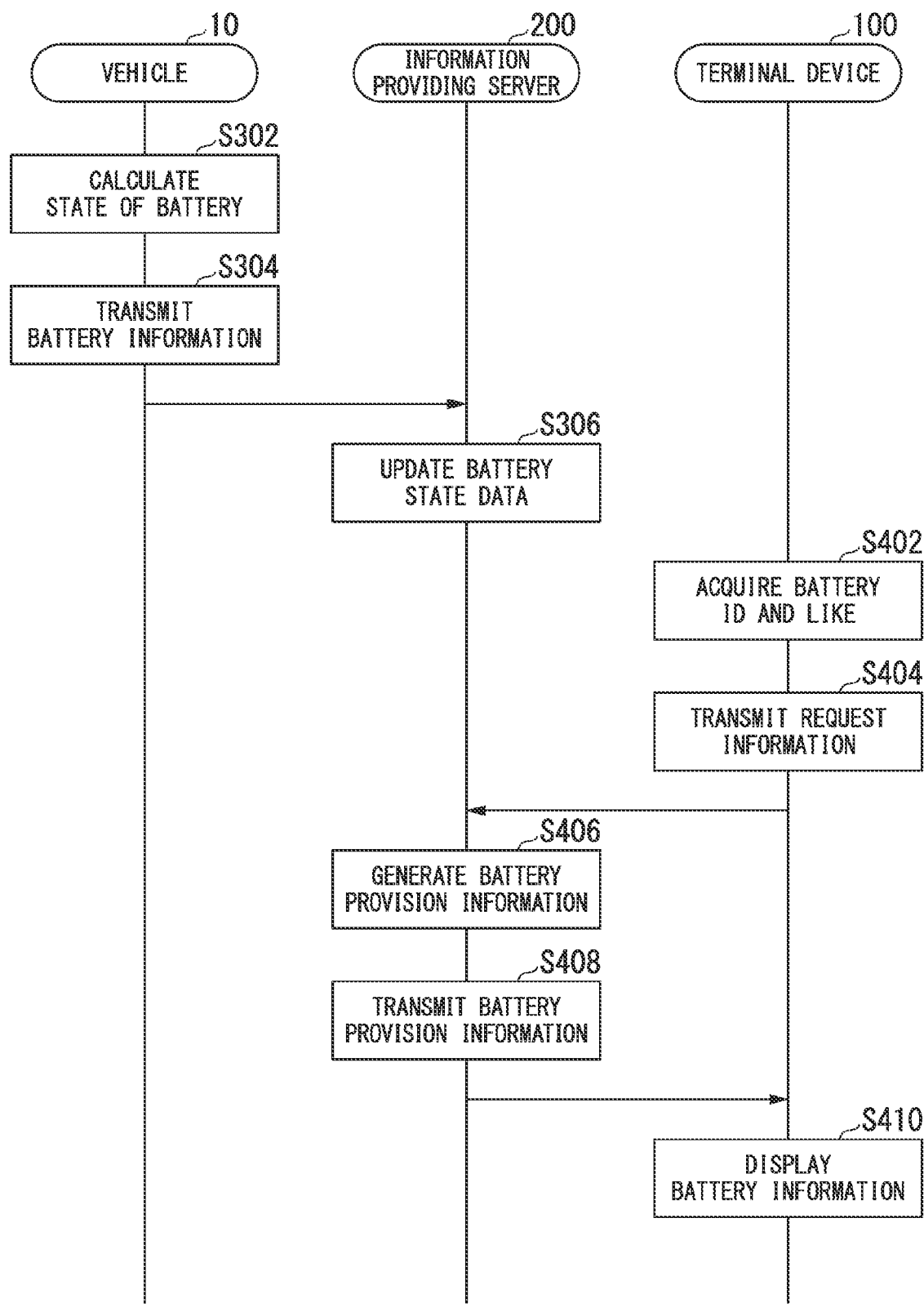
FIG. 10 is a sequence diagram showing an example of a process executed in the information providing system.

The battery 16 mounted in the vehicle 10 is, for example, removed from the vehicle 10 and then distributed to the market for secondary use other than the purpose of mounting in the vehicle 10. Hereinafter, the flow of the process executed in each of the vehicle 10, the terminal device 100, and the information providing server 200 in the entire information providing system 1 will be described with reference to FIG. 10 in time series with respect to the secondary use of the battery 16. FIG. 10 is a sequence diagram showing an example of a process executed in the information providing system 1.

In the information providing system 1, as shown in FIG. 10, for example, the vehicle 10 calculates a battery state of the battery 16 mounted in the vehicle 10 at predetermined time intervals (step S302). Subsequently, the vehicle 10 transmits battery information based on the calculated battery state to the information providing server through the communication device 40 (step S304).

Subsequently, the information providing server 200 adds the battery information transmitted by the vehicle 10 to the battery database 282 stored in the storage unit 280, and updates the battery database 282 (step S306). According to the flow of the above, the battery database 282 stored in the information providing server 200 is updated and data is accumulated at any time.

Because there are a plurality of vehicles 10 for transmitting battery information, the information providing server 200 transmits battery information with a plurality of battery IDs at any time. The information providing server 200 updates the battery database 282 at any time on the basis of the transmitted battery information.

After the battery 16 is removed from the vehicle 10, the battery information with respect to the battery 16 will not be transmitted by the vehicle. When the user requests the provision of battery information with respect to the battery 16, the state is normally a state in which the battery 16 is removed from the vehicle 10 and is a state in which the battery database 282 is not updated.

On the other hand, for example, a user who wants to receive the battery information with respect to the battery 16 removed from the vehicle 10 photographs the two-dimensional code 16DC attached to the battery 16 with the photography unit 130 of the terminal device 100. The terminal device 100 acquires the battery ID and the manufacturing date of the battery included in the two-dimensional code 16DC in the control unit 140 by photographing the two-dimensional code 16DC with the photography unit 130 in accordance with the operation of the user (step S402). Subsequently, the terminal device 100 generates request information including the acquired battery ID, the request level information according to the request level pertaining to the user, and the like. Subsequently, the terminal device 100 transmits the generated request information to the information providing server 200 using the transmission/reception unit 110 (step S404).

In the information providing server 200 that has received the request information transmitted by the terminal device 100, the provision unit 240 reads information according to request level information included in the request information from the battery database 282 stored in the storage unit 280. Subsequently, the information providing server 200 generates battery provision information from the read battery database 282 (step S406). Subsequently, the information providing server 200 transmits the battery provision information that has been determined to the terminal device 100 using the communication unit 210 (step S408).

The terminal device 100, which has received the battery provision information transmitted by the information providing server 200, causes the touch panel 120 to display the received battery provision information (step S410).

The battery provision information is displayed on the touch panel 120, so that the battery provision information is provided to the user. Thus, the process executed in the entire information providing system 1 is completed.

According to the embodiment described above, the information providing server 200 provides the battery provision information to the user of the terminal device 100 in accordance with the request information transmitted by the terminal device 100. The information providing server 200 generates the battery provision information with reference with the request level included in the request information so that the battery provision information is provided. Thus, the information providing server 200 can allow the status of the battery according to the purpose of secondary use to be ascertained.

Also, although the user is authenticated using the user ID in the above-described embodiment, the user may be authenticated in other forms. For example, the user may be authenticated by biometric authentication such as face authentication of the user instead of or in addition to the authentication based on the user ID. Also, although the information providing server 200 stores the battery database 282 and updates the battery database 282 using the battery information transmitted by the vehicle 10 in the above-described embodiment, the update of the battery database 282 may be performed by a data collection device other than the information providing server 200. In this case, it is only necessary for the information providing server 200 to acquire the battery database 282 from the data collecting device when the request information transmitted by the terminal device 100 has been received.

Although modes for carrying out the present invention have been described above using the embodiments, the present invention is not limited to the embodiments and various modifications and replacements can be applied without departing from the scope of the present invention.

What is claimed is:

1. An information providing server comprising:
a processor configured to:
  communicate with a terminal device; and
  read battery provision information including an element according to a request level from a battery database including a plurality of elements regarding a secondary battery in response to a request received from the terminal device, the request including the request level according to an authority purchased by a user who uses the terminal device from an information provider who uses the information providing server, and the request further including code information assigned to the secondary battery for a vehicle read by the terminal device, and provide the battery provision information to the terminal device,
wherein, as the request level increases, a number of elements included in the battery provision information according to the request level read from the battery database increases.

2. The information providing server according to claim 1, wherein the element is at least one of an item and a quantity.

3. The information providing server according to claim 1, wherein the processor is further configured to communicate with the vehicle on which the secondary battery is mounted, and
acquire battery information about the secondary battery transmitted by the vehicle.

4. The information providing server according to claim 1, wherein the request level is in accordance with a purpose of secondary use of the secondary battery from the vehicle.

5. An information providing system comprising:
the information providing server according to claim 1; and
an application program configured to be executed in the terminal device,
wherein the application program causes the terminal device to read the code information assigned to the secondary battery and transmit the code information to the information providing server.

6. A computer-readable non-transitory recording medium storing a program for causing a computer of a terminal device to
read code information assigned to a secondary battery and transmit the code information to the information providing server according to claim 1.

7. A computer-readable non-transitory recording medium storing a program for causing a computer to:
communicate with a terminal device; and
read battery provision information including an element according to a request level from a battery database including a plurality of elements regarding a secondary battery in response to a request transmitted from the terminal device, the request including the request level according to an authority purchased by a user who uses the terminal device from an information provider, and the request further including code information assigned to the secondary battery for a vehicle read by the terminal device, and provide information about the battery provision information to the terminal device, wherein, as the request level increases, a number of elements included in the battery provision information according to the request level read from the battery database increases.

* * * * *